Oct. 3, 1950 G. M. ROSENBLUM 2,524,141

APPARATUS FOR WIRE CODING

Filed March 18, 1944 2 Sheets-Sheet 1

INVENTOR.
George M. Rosenblum
BY Irving F. Goodfriend
Atty.

Oct. 3, 1950 G. M. ROSENBLUM 2,524,141

APPARATUS FOR WIRE CODING

Filed March 18, 1944 2 Sheets-Sheet 2

INVENTOR.
George M. Rosenblum
BY Irving F. Goodfriend
Atty.

Patented Oct. 3, 1950

2,524,141

UNITED STATES PATENT OFFICE 2,524,141

APPARATUS FOR WIRE CODING

George M. Rosenblum, Merrick, N. Y.

Application March 18, 1944, Serial No. 527,062

2 Claims. (Cl. 175—183)

This invention relates to apparatus for ascertaining and coding at each terminal thereof the individual wires comprising an electrical system.

In my co-pending application Ser. No. 516,176, filed December 30, 1943, I have illustrated such a method and apparatus in which an indicator circuit is completed by the individual unknown wire to thereby visually identify it.

The present invention is concerned with the provision of a similar method and apparatus but in which the indicator circuit is broken by the individual then unknown wire, which is thus visually identified.

The present invention has particular application to electrical systems comprising a relatively large number of individual wires leading from a central station to a remote point, such as a telephone communications system or a control system, for example, that found in a battleship, submarine, or the like.

In a telephone system, cables leading from an exchange (central station) to a remote point (perhaps in a manhole) comprise a great number of wires, one hundred, five hundred or even a thousand or more of which each wire or pair must be coded or identified at each of its ends so that a lineman can connect that wire, for example, in an individual subscribers circuit.

Heretofore this operation has required the activities of two men, one at the exchange office and one in a manhole at the point where a splice or extension of the cable was to be made. Both men established telephonic communication with each other, whereupon the man in the manhole introduced one of the wires or pairs to be identified into a "tone box" (so called), by means of which an audible tone or note was carried on that wire. The man at the exchange thereupon contacted each of the wire terminals of that particular cable, or section of cable, until he encountered the tone carrying wire. Then he announced to his colleague at the remote point the number of the wire carrying the tone. The man at the remote point there identified the wire appropriately and proceeded with the next wire; the procedure being repeated until all the wires to be identified or paired, had been coded or identified.

My invention contemplates the provision of a means, operable by just one person after it has been connected in the system, and by which any number of wires comprising an electrical system, such as a telephone communications system, can be quickly and with relative ease identified and coded at each end thereof, positioned at stations or points a comparatively great distance apart.

My present invention also enables the ready and easy determination of the identity of a wire in an electrical system that may be short circuited to another wire of that system and the identity of the latter wire.

These and other objects, advantages and uses of the present invention will become apparent from the description which follows and the drawings appended thereto in which like reference characters identify like elements and wherein.

Figure 1:
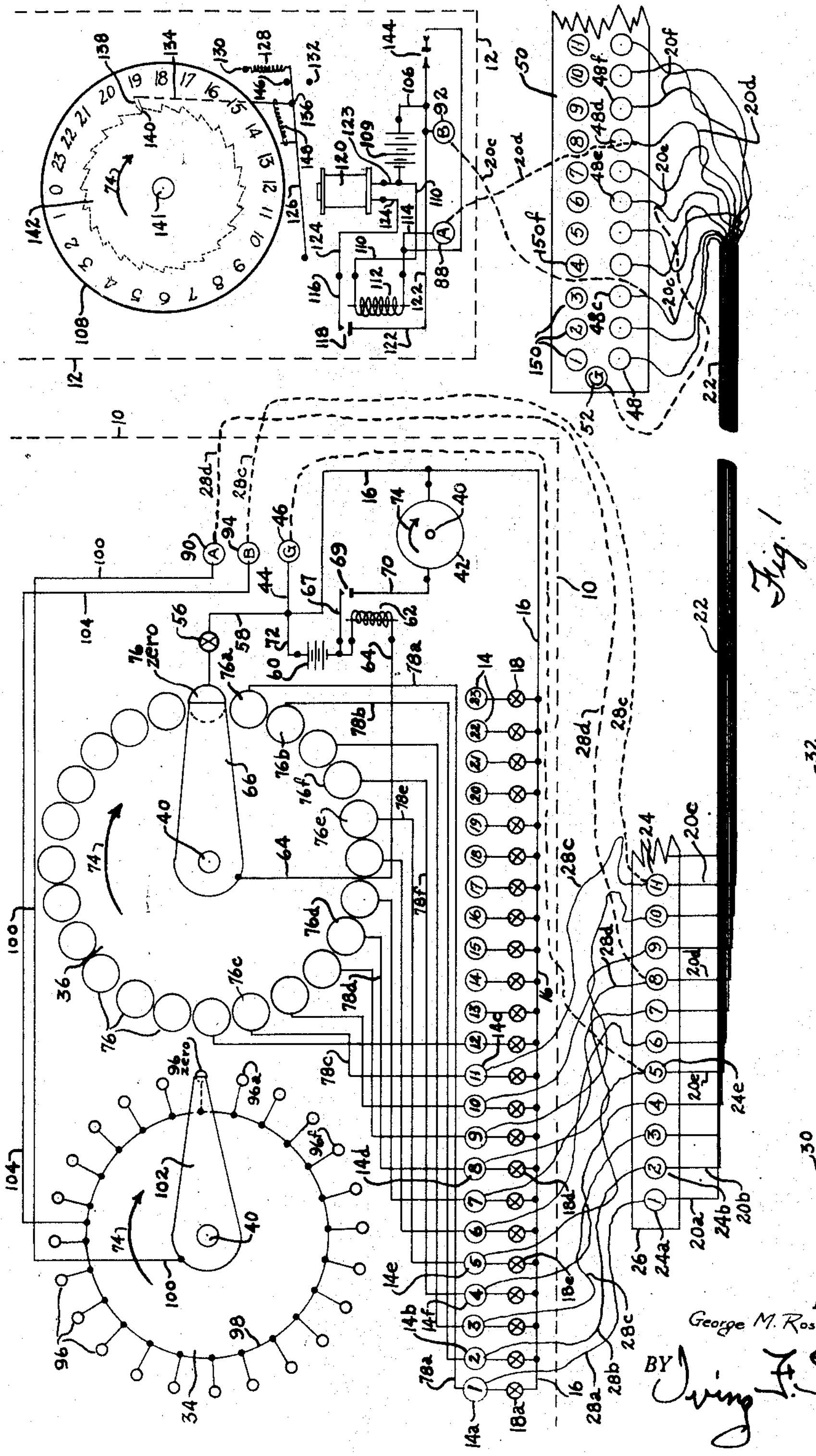
Fig. 1 is a schematic wiring diagram of one embodiment of a wire coding apparatus according to my invention.

It will be understood that conventional mechanical details such as detents, clutches, knobs and the like are not shown in the drawings, since those skilled in the art will supply them where needed inasmuch as the invention will be readily understood without reference to them.

Referring now to the drawing and more particularly Fig. 1, I have there illustrated an embodiment of my invention, which comprises the transmitter, generally indicated by the reference character 10, and which is located at one point of the electrical system, for example, the exchange or central station and the receiver, generally indicated by the reference character 12, and which is located at a remote point of the electrical system, for example at the other terminal of the cable, which may be in a manhole of a telephone system.

It will of course be understood that the elements of the transmitter as well as the elements of the receiver are housed or enclosed in a suitable casing, an example of which may be found in my said co-pending application, Ser. No. 516,176, neither of which casings therefore need here be illustrated for an understanding of the invention.

The casing or housing of the transmitter 10 is provided with the terminal plugs 14, each of which is numbered consecutively and has connected between it and the lead 16, a switch 18, the purpose of which will be explained. The number of such plugs 14, (twenty-three of which are shown on the drawing), is for purposes of illustration only as any greater or lesser number may be used.

For example, to operate my apparatus for the purpose of coding the individual wires 20 comprising a cable 22, the end of each wire at that point in the system whereat the transmitter 10 is located is connected to the terminals 24, also consecutively numbered of the terminal strip 26 or they may be found so connected.

Figure 2:
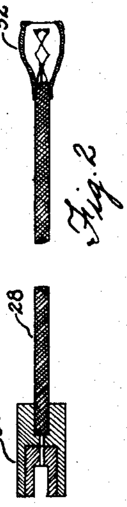
Fig. 2 is a section of a connector which may be used with my invention.

The transmitter 10 is then connected to the wires at the terminal strip 26, as by means of the conventional connector 28 (Fig. 2), the socket 30 of which is inserted in a plug 14 and the terminal clip 32 of which is connected to a wire 20 or a terminal 24 at the terminal strip 26. Each wire at the station where the transmitter is located is thereby numbered and coded, as by suitable tags, if desired, affixed to each wire, or are self identified if permanently connected to the numbered terminal strip 25.

Figure 3:
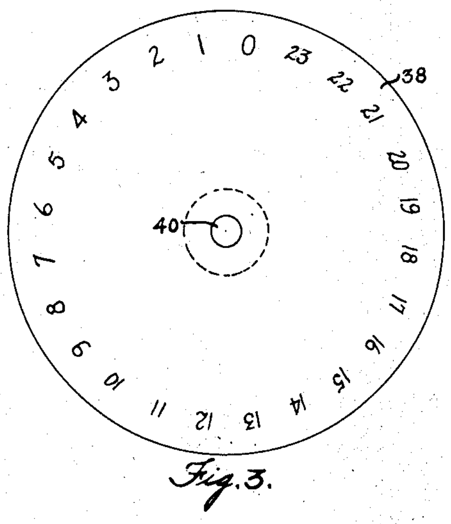
Fig. 3 is a front view of the indicator dial.
Figure 6:
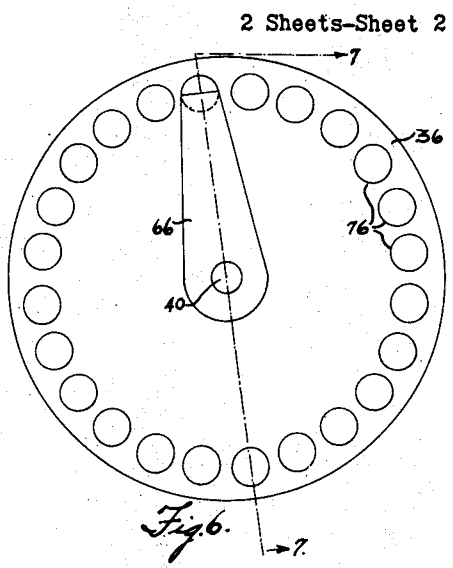
Fig. 6 is a front view of the commutator.
Figure 4:
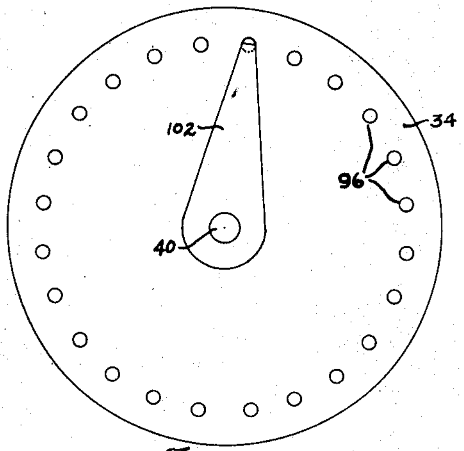
Fig. 4 is a front view of the coordinator and synchroniser of the position of the indicator dials.
Figure 7:
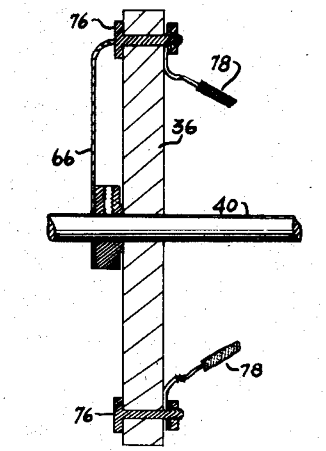
Fig. 7 is a section on the line 7—7 of Fig. 6.
Figure 5:
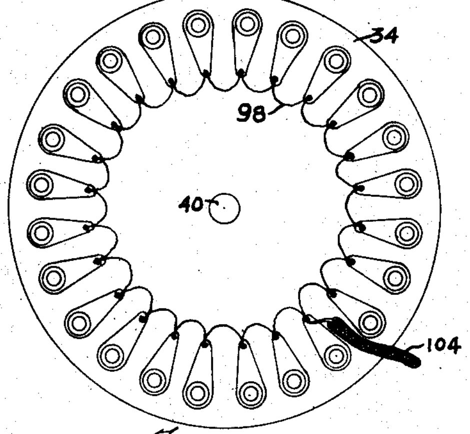
Fig. 5 is a rear view thereof.

The movable parts in the transmitter 10, which are the coordinater or synchroniser 34, the commutator 36 (all shown in Fig. 1 and Figs. 4, 5 and 6, respectively) and the indicator dial 38 (see Fig. 3) are all mounted on the shaft 40 of the motor 42 so that they operate together in synchronism with each other.

Upon connecting the individual wires of the electrical system to the transmitter 10, as by means of conventional connectors 28, the person at the central station then proceeds to hook up the apparatus for its operation.

This is done by closing the apparatus switch 56, and any one of the switches 18, for example that one 18*a* between the number one plug 14*a* and the common lead 16 to the ground lead 44, which is connected to the ground plug 46. The operator at the remote point, where the receiver 12 is located, concurrently connects the other ends of the wires 20 to the blank or unnumbered terminals, binding posts, clips or the like 48 of the terminal strip or bus bar 50 which is a metallic conductor and connects all wires 20 to one another through itself.

Upon closing the apparatus switch 56, the circuit through the lead 58, lead 72 to the power source 60, relay 62, lead 64, through wiper arm 66, zero contact 76 and back to switch 56 is completed and relay 62 becomes energized. Energization of the relay 62, attracts the arm 67 thus closing the switch 69 and completing the motor circuit through lead 70, motor 42, lead 16, lead 72, power supply 60 and arm 67 back to switch 69.

Rotation of the motor 42 in the direction of the arrow 74, now moves the wiper arm 66 from the normal or zero contact onto the next adjacent commutator contact 76*a* which is connected by wire 78*a* to the number one plug 14*a*, the wiper arm being constructed to bridge the distance between two adjacent contacts 76 as it is moved around the commutator 36 in the direction of the arrow 74.

As the wiper arm 66 leaves the zero contact 76 to break the relay 62 circuit, it engages the number one plug contact 76*a*, which keeps the relay 62 energized through closing the circuit from contact 76*a*, lead 18*a*, number one plug 14*a* and closed switch 18*a*, common ground wire 16, lead 72, power supply 60, relay 62, lead 64, wiper arm 66 and back to contact 76*a*. Relay 62 remains energized and switch 69 is thereby maintained closed to keep the motor 42 operating.

As the wiper arm 66 bridges each pair of adjacent commutator contacts 76 the relay 62 circuit is held closed through the grounded wire of the transmitter 10, which is the number one wire, through the corresponding switch 18*a* that has been closed.

For example, as the wiper arm 66 engages the number two commutator contact 76*b*, the relay circuit is completed from that contact through the lead 78*b* to the number two plug 14*b* and its connector 28*b*, the number two wire 20*b* to its still unknown terminal binding post 48, the bus bar 50, back through the number one wire 20*a* and its connector 28*a* the closed switch 18*a* to common lead 16, power supply 60 and relay 62 the wiper arm 66 to contact 76*b*.

Thus so long as the respective end of each wire is connected to a numbered plug 14 of the transmitter 10 and an unnumbered binding post 48, the switches 56 and 18*a* closed, the wiper arm 66 will continue its rotation about the commutator.

The operator at the receiver 12, after the lapse of a few seconds to give the operator at the central station sufficient time to set up operation of the transmitter 10 as I have just described, then removes any wire for example 20*e*, from its binding post 48*e*. For illustration assume that this is the wire connected to the transmitter plug 14*e* (number five wire).

When the wiper engages commutator contact 76*e*, connected to the number five wire, which has been removed at the remote point, the circuit through the relay 62 having been thereby opened, the motor 42 is stopped since the switch 69 is opened by the release of the arm 67.

The indicator dial 38 (Fig. 3) is mounted on the motor shaft 40 so that when the wiper arm 66 engages a commutator contact 76, the number of the plug 14 to which it is connected by a lead 78 will be visible to the operator (as in the apparatus described in my application Ser. No. 516,716). Therefore, since the number five wire (20*e*) has been removed from the binding post 48*e*, the commutator wiper arm 66 will stop when it reaches contact 76*e*, which is connected to the plug 18*e* in the number five wire circuit. This occurs because the relay 62 circuit is opened when the wire 20*e* has been removed from the terminal strip 50, thereby releasing the arm 67 and opening the motor circuit switch 69.

When this happens the operator at the central station perceives that the indicator dial 38 has stopped revolving so that the number five is visible, and he immediately opens the number one wire switch 18*a*. He also closes the number five wire switch 18*e* and connects the terminal switch 24*e* to the G binding post 46 by means of a connector 28*e*, thereby connecting wire number five to the common lead 16.

The operator at the remote point, waiting a few seconds after removing wire 20*e* from terminal strip 50 in order that the operator at the central office can note the actual number (five) of the wire 20*e* which was removed, then connects wire 20*e* to post 52, the G post of terminal strip 50.

When this is done the wiper arm 66 again commences its rotation around the commutator, since there is now no longer an open circuit in the system of wires connecting the transmitter and the terminal strip or bus bar 50.

The operator at the remote station 12, of course does not know that he has transferred the number five wire to the G post 52, but the operator at the central station knows that the grounded wire is the number five wire of the cable and could at once notify the operator at the remote point if they were in telephonic communication. In any event, the code symbol G may be applied to each end of that same individual wire, to be later, if desired, changed to a number designation upon learning that the G wire is in reality the number five wire.

The procedure thus far outlined, contemplates the application of my invention to a system in which the wires are not encased in a metallic sheath or pipe. If the wires or cable is encased in such a sheath or pipe, the operators at both the central office and the remote point need only connect their respective G posts (46 at the transmitter station and 52 at the remote point) to the sheath or pipe at their respective ends. This would eliminate the necessity of using one of the wires in the cable or system as a circuit return through its switch 18 and the common lead 16, using instead, the sheath or pipe as a conductor.

It is obvious that the operators at both points could be in telephonic communication during the procedure of setting up my apparatus so that the operator at the remote point could be immediately informed of the actual number of the wires which he removes from the terminal strip 60 and which will be used to operate the receiver in coordination or synchronism with the transmitter, as will be clear from the further description which follows.

The operator at the remote station 12 permits several seconds to elapse in order to give the operator at the transmitter 10 time to open and close the switches 18*a* and 18*e*, after which he removes at random a wire 20*d* from one of the unnumbered binding posts 48*d* and connects it to the A binding post 88 on the receiver 12. Though he does not know it, this for example, might be the wire already connected to the plug 14*d* of the number eight wire which in turn is connected to the commutator contact 76*d* by the lead 78*d*. Therefore when the wiper arm 66 rotates to and engages the contact 76*d*, the relay 62 circuit is again broken, thus opening the motor circuit and stopping the motor at this point, the indicator dial visually indicating the number eight. The operator at the transmitter immediately transfers the connector 28*d* to the A binding post 90 on the transmitter 10, and closes wire switch 18*d* which again completes the relay 62 circuit to commence operation of the motor 42 and so continue rotation of the wiper arm 66.

Again in the absence of telephonic communication between both operators the operator at the remote station does not know that he has connected the number eight wire to the A binding post 88, but that is known to the operator at the transmitter 10. However, this is unimportant, since each end of the wire may be coded by the letter A, which later may be, when convenient, translated to the proper code number or this wire may be coded with its actual number if the operators are in telephonic communication.

The operator at the receiver 12 permits several seconds to elapse so that the operator at the transmitter 10 will have sufficient time to connect the proper wire to the A binding post 90 and close wire switch 18*d* after which the motor will again commence operation and rotate the commutator wiper arm.

Another wire is then removed from the receiver bus bar 50, for example, the wire 20*c* from the binding post 48*c* and connected to the B binding post 92 of the receiver 12. This might be wire number eleven, the plug 14*c* of which is connected by the lead 78*c* to the commutator contact 76*c*. As the wiper arm 66 engages the contact 76*c*, the relay 62 circuit is again opened to stop the motor 42 and the operator at the transmitter 10 immediately connects the connector 28*c* to the B binding post 94 and closes switch 18*c*. This, of course, identifies the number twelve wire as the one connected to the B post.

The receiver or position indicator 12, by means of which the wires are identified at the remote point in accordance with their code designation at the central station, has now been electrically connected with the coordinator means 34, the synchronized operation of which I shall now describe.

The coordinator 34 is provided with a plurality of contacts 96, which are angularly positioned to match each of the commutator contacts 76 and therefore a contact that corresponds to each individual plug 14 of the transmitter. The coordinator 34 contacts are interconnected by the common lead 98, which is connected to the B terminal 94 by the lead 104. The coordinator 34 is also provided with the wiper arm 102 connected to the shaft 40 and is in alignment or registration with the wiper arm 66, preferably somewhat in advance thereof, so that it will engage a contact 96 corresponding in position to a corresponding contact 76 on the commutator. For example, when the wiper arm 66 engages the commutator contact 76 (zero position), the wiper arm 102 will engage or preferably have engaged the corresponding zero position coordinator contact 96, in which position the number zero of the indicator dial 38 will be visible. As the commutator wiper arm 66 completely engages the number one wire contact 76*a* to open the relay 62 circuit, the coordinator wiper arm 102 will have engaged the contact 96*a* and the number one on the indicator dial 38 will be visibly positioned, the two wiper arms and the indicator dial operating in synchronized position for each numbered wire connected to the transmitter 10.

The coordinator wiper arm 102 is connected by the lead 100 to the A terminal post 90. As this wiper arm 102 successively engages a contact 96, the circuit between the coordinator 34 and the means at the receiver for translating the successive electrical impulses to mechanical intermittent rotation of the indicator dial 108, is closed. The indicator dial 108 is thereby moved a single position forward in synchronism with the forward movement of the transmitter indicator dial 38 in the manner that I shall now describe. For example, as the motor 42 rotates the commutator wiper arm 66 from zero position onto the contact 76*a* to complete the motor circuit through the number one wire, the wiper arm 102 of the coordinator 34 is brought into contact with the contact 96*a* to close the circuit to the receiver 12 through the common lead 98, the lead 104, the B terminal 94, the connector 28*c*, the wire 20*c*, terminal B92 of the receiver, lead 106, source of power 109, lead 110, relay 112, lead 114 to the A terminal 88 back through the wire 20*d*, the connector 28*d*, the A terminal 90, the lead 100, the wiper arm 102 back to the terminal 96*a*.

The sensitive relay 112 being energized, therefore attracts the arm 116 to close the switch 118 thereby completing the power relay 120 circuit, through the leads 122 and 106, the power supply 109 and the lead 123, to power relay 120, the lead 124 back through arm 116 to switch 118.

The pivoted arm 126 of the power relay 120 is thereby attracted against the tension of the spring 128 which is secured at one end to the end of the arm 126 and at its other end to the stationary pin 130 and is moved down against the limiting pin 132. This movement pulls down the pawl 134, which is pivoted at 136 to the arm 126, the finger 138 in engagement with a tooth 140 of the ratchet wheel 142 moving it and the indicator dial 108 (both fixed to the rotatable shaft 141) one tooth to visually disclose a next succeeding number thereon.

As the wiper arm 66 of the transmitter commutator is moved to the next commutator contact 76 by the motor 42, the wiper arm 102 of the coordinator is also moved away from the preceding contact 96 thereby breaking the circuit through the A and B terminals in the transmitter and receiver to thereby open the circuit of the sensitive relay 112 and so breaking the power circuit by opening the switch 118. The arm 126 is released, the pawl 134 returning to normal position to engage the next succeeding ratchet tooth.

When all the wires have been hooked up as heretofore described, since the switch 56 is closed, the commutator wiper arm 66 will continue to rotate because it bridges adjacent contacts, each of which closes a circuit through a wire 20 connected thereto. For each wire so contacted, the coordinator wiper arm 102 will also engage a corresponding contact 96 to thereby step the receiver indicator dial 108 one position for each contact to thereby identify, as I will describe, that wire at the remote point.

When the operator at the remote point observes that the indicator dial has made several revolutions he knows that the instruments have been properly connected together. When the operator at the central station (transmitter 10) observes that his indicator dial is revolving he knows that the same intelligence has been conveyed to the operator at the remote point and he therefore opens the apparatus switch 56, the wiper arm 66 returning to the normal zero position where it must stop since the motor circuit has there been opened.

When the indicator dial 108 at the receiver 12 is correspondingly stopped, the operator there knows that all parts of the transmitter are at zero or normal position and if the indicator dial of the receiver 12 has not also stopped at normal or zero position, it is immediately adjusted so that it will correspond to the zero setting of the transmitter 10.

This may be done either manually by means of a knob attached to shaft 141, (not shown in the drawings) or by a means such as illustrated in Fig. 1, whereby the power relay 120 circuit is closed by the push button switch 144. For each time that the circuit is closed by switch 144, the indicator dial is moved one tooth or space and can thereby be quickly positioned so that it corresponds to the normal zero position of the parts in the transmitter.

After the lapse of a minute or two, the operator at the transmitter again closes the switch 56 to commence rotation of the commutator wiper arm 66 and the coordinator wiper arm 102, the movement of which is transmitted to the indicator dial 108 in synchronism with the indicator dial 38 of the transmitter, with which it is provided. The operator at the transmitter is no longer required and therefore may go to some other work, the acts of connecting the entire unit together for the identifying and coding operation taking but a relatively short time.

The operator at the receiver 12 then commences coding the wires for which operation he does not require the assistance of anyone else. He does this by removing any wire from an unnumbered binding post, for example wire 20f from the binding post or clip 48f. Though he does not know this at that moment, this wire, for example, may be the wire connected to the number four plug 14f.

As the wiper arm 66 engages each successive contact 76, the coordinator wiper arm 102 correspondingly engages a contact 96, for each of which contacts the receiver indicator dial 108 is moved one tooth or numbered space. It will of course be understood that the arm 102 is preferably advanced ahead of the arm 66 a sufficient distance in order that the indicator dial 108 will have been moved a distance sufficient to disclose the number of that individual wire connected to the corresponding commutator contact as it is engaged by the arm 66.

Therefore, as the arm 66 is moved into engagement with the contact 76, the arm 102 has just engaged the contact 96f to rotate the indicator dial 108 into position where the number four thereon is visible to the operator. Since the number four wire has been removed from the binding post 48f, the circuit through the motor 42 is opened and the arm 66 will not move beyond the contact 76f. However since the arm 102 is advanced in rotation, and is so constructed that it does not bridge adjacent contacts 96, the circuit through the sensitive relay 112 will also be broken to permit the arm 126 to return to its normal position on a tooth 140 of the ratchet 142, the pin 146 limiting its upward movement and the spring 148 holding it against the ratchet 142.

Since the indicator dial 108 has ceased rotation with the number four visible to the operator, he now knows that he has removed the number four wire and he immediately connects wire 20f to the number four binding post 150f at the receiver 12, as it is now identified. At the same time he removes another wire 20 from the unnumbered post 48.

Since the wire 20f (number four) has now been reconnected in the apparatus through binding post 150f, the transmitter and receiver will again operate until the commutator contact 76, corresponding to the removed wire 20 is reached. Since the power circuit is now opened by that wire, the apparatus again stops with the number corresponding to the removed wire 20 appearing to the operator on the dial 108, thereby identifying the wire for connection to the properly numbered post 150.

These operations are repeated successively until each individual wire is identified and coded by the one operator at the remote point.

The number of plugs, terminals, clips or binding posts in a single apparatus is commercially limited by questions of size of the commutator and indicator dials.

It will now be recognized that my invention will by its construction necessarily detect the presence of an open circuit in one or more of the plurality of wires comprising the cable or system being coded because in the course of inter-connecting the transmitter and receiver of my invention should any wires in the system being coded be open, the indicator dial at the transmitter will not make a complete revolution but will stop at the number of the open wire. The operator at the central office will have to close the switch 18 corresponding to the numbered wire at which the indicator has stopped in order to make the indicator continue its rotation. He then marks the open wire "open" and should the dial stop at any other number he would repeat this operation until all open circuited wires have been determined.

It will now be recognized that I have provided a relatively simple and inexpensive apparatus by means of which the individual wires of a comparatively large group thereof in a system or cable may be very rapidly identified and coded by only a single operator after the apparatus has been connected in the system or to the cable wires.

While I have described in detail certain embodiments of my invention, it will be understood that such embodiments are merely for illustration and that many changes and modifications may be made thereto without departing from the spirit and scope of the invention.

I claim:

1. In an apparatus for ascertaining the individual wires comprising a group of wires, a transmitter comprising a rotor, a commutator having a wiper arm driven by the rotor and a plurality of spaced electrodes for contact with the wiper arm upon the rotation thereof by the rotor, a plurality of terminals having indicia thereon, each terminal for connection to a selected wire in the group of wires, each terminal electrically connected to one of the electrodes and a synchronizing unit comprising a second arm driven by the rotor in synchronism with the first arm and a plurality of spaced second electrodes for contact by the second arm upon rotation thereof by the rotor, the second electrodes being equal in number to the first electrodes and a selected second electrode contacted by the second arm upon contact of a selected first electrode by the first arm; and a receiver comprising an indicator dial having indicia thereon corresponding in number to the number of first and second electrodes and an indicia on the dial corresponding to an indicia on a terminal, electrical means for rotating the indicator dial, and a plurality of second terminals, an electric circuit for driving the said electrical means formed upon connecting a second terminal to a first terminal, a selected first and second terminal for electrical connection by a wire of the group said synchronizer being thereby connected to the receiver dial rotating means through a circuit formed by wires of the group whereby the dial rotating means is operated upon completing a circuit through the second wiper arm and a second electrode and said rotor being operated through a circuit completed by wires of the group and the first wiper arm and a first electrode engaged thereby, said rotor operating circuit being opened upon disconnecting a wire from a second terminal connected through a first terminal connected to a first electrode through which the rotor circuit is made.

2. In an apparatus for coding each wire in a group of wires comprising an electrical system, a transmitter, a plurality of terminals on the transmitter, a receiver, a plurality of second terminals on the receiver, each first terminal connected to a corresponding second terminal by a wire in the group of wires, a rotor operated by a circuit formed by a pair of wires connected to the first and second terminals, a commutator in the transmitter and having a wiper arm driven by the rotor and a plurality of spaced contacts for the wiper arm, each spaced contact connected to a first terminal, a synchronizer having an electrical driving means, a second wiper arm rotated by said electrical driving means and a plurality of spaced second electrodes, said second wiper arm being driven in synchronism with the first wiper arm and each second electrode contacted by the second wiper arm upon the first wiper arm contacting a first electrode, an indicator means in the receiver having indicia thereon each indicium being positioned at a selected point upon contact by the first wiper arm of a selected first electrode and concurrent contact by the second wiper arm of a corresponding second terminal, and an electric circuit for driving the said electrical means, means for operating the indicator means formed upon electrically connecting the electrical means to the synchronizer, said circuit formed by wires in the group of wires upon connecting a first and second terminal.

GEORGE M. ROSENBLUM.

REFERENCES CITED

The following references are of record in the file of this patent:

UNITED STATES PATENTS

| Number | Name | Date |
|---|---|---|
| 709,806 | Title | Sept. 23, 1902 |
| 843,814 | Hewlett | Feb. 12, 1907 |
| 1,042,692 | Kramer | Oct. 29, 1912 |
| 1,501,437 | Connet | July 15, 1924 |
| 1,738,710 | Jones | Dec. 10, 1929 |
| 1,945,665 | Stewart | Feb. 6, 1934 |
| 1,971,686 | Kinkead | Aug. 28, 1934 |
| 1,973,727 | Rollins | Sept. 18, 1934 |
| 2,133,384 | Fisher et al. | Oct. 18, 1938 |

FOREIGN PATENTS

| Number | Country | Date |
|---|---|---|
| 11,881 | Great Britain | of 1899 |
| 105,986 | Great Britain | May 7, 1917 |